United States Patent [19]
Katsuno

[11] Patent Number: 4,584,878
[45] Date of Patent: Apr. 29, 1986

[54] GAS-RATE SENSOR

[75] Inventor: Yasunobu Katsuno, Kanae, Japan

[73] Assignee: Tamagawa Seigi Kabushiki Kaisha, Tokyo, Japan

[21] Appl. No.: 653,450

[22] Filed: Sep. 24, 1984

[51] Int. Cl.[4] .............................................. G01P 15/08
[52] U.S. Cl. ................................. 73/497; 73/516 LM
[58] Field of Search .................. 73/497, 516 LM, 515, 73/521

[56] References Cited

U.S. PATENT DOCUMENTS 4,408,490 10/1983 Takahashi et al. .................... 73/497

*Primary Examiner*—Anthony V. Ciarlante
*Attorney, Agent, or Firm*—Tilton, Fallon, Lungmus & Chestnut

[57] ABSTRACT

A gas-rate sensor is disclosed which comprises, similar to a conventional one, a hollow cylindrical casing with a gas sealed therein, a gas pump arranged within the casing at its one end to circulate the gas therein, a nozzle means arranged within the casing at its other end to inject the gas as a gas flow therein, and a pair of thermosensitive elements disposed inside the casing so as to be exposed to the gas flow, whereby when the casing is applied an angular velocity the gas flow is deflected to cool the two thermosensitive elements unequally causing a difference in electric resistance between them, the measurement of the difference in resistance making it possible to detect the angular velocity, and which is characterized in that a heater plate is disposed within the casing so as to directly heat the gas circulated therein in order to compensate for the influence of the outside temperature on the accuracy of the measurement of the angular velocity instead of heating the casing from its outer periphery by the wound heating wires as is usual in a conventional sensor to achieve the same object, the present invention allowing much earlier and more stable heating of the sealed gas than in a conventional one.

4 Claims, 4 Drawing Figures

GAS-RATE SENSOR

BACKGROUND OF THE INVENTION

The present invention relates to a gas-rate sensor and more particularly to a temperature control means therefor.

A gas-rate sensor comprises a closed casing in which is sealed a gas, a pair of thermosensitive elements disposed within the casing, and a nozzle also arranged within the casing so as to confront the thermosensitive elements. In operation, when the electric currents flow through the respective thermosensitive elements to heat them, and simultaneously a gas is injected from the nozzle towards the heated thermosensitive elements within the casing, if the casing is in a state where no angular velocity is applied thereto the heated thermosensitive elements are both equally cooled by the injected gas, but when the casing is applied an angular velocity at this state the gas flow is deflected relative to the casing therein so that unequal cooling occurs between the two thermosensitive elements, resulting in generation of a minute electric potential difference between the two elements, and the measurement of the electric potential difference makes it possible to measure the angular velocity to which the casing is subjected. In this case, the gas is pressurized by an electrostriction oscillatory pump arranged within the casing at its one end, and after it is injected from the nozzle it is returned to the nozzle again so as to circulate within the casing.

Although a gas-rate sensor operates as described above, since it cannot ignore that the accuracy of the measured results are affected by the temperature of the atmosphere in which the casing is placed and thus the thermosensitive elements are also influenced by the atmospheric temperature, in order to suppress this effect to the minimum it has been already proposed to wind heating electric wires around the outer periphery of the casing so as to heat it from the outside, maintaining the temperature of the gas circulating within the case higher than that of the thermosensitive elements.

That is, this proposed gas-rate sensor comprises, as shown in FIG. 1 of the attached drawings, a hollow cylindrical casing 1 opened at both ends, the interior of the casing 1 sealed from the outside by closing the open ends with a pump holder 2 and a junction terminal board $3_0$, respectively, and the pump holder 2 constitutes an electrostriction oscillating pump 3 in association with a circular electrostriction transducer 3*a* made of electrostrictive ceramics which has its outer periphery integrally secured to the pump holder 2. And an electrode holder 4 is disposed within the casing 1 in parallel with and spaced from the electrostriction transducer 3*a*. Four electrodes 5*a*, 5*b*, 5*c* and 5*d* are mounted to the electrode holder 4 so as to be symmetric with respect to the central axis of the casing 1 although only the electrodes 5*a* and 5*b* are seen in the drawing, and the respective ends of the pairs of the electrodes 5*a*, 5*b* and 5*c*, 5*d* have thermosensitive elements 6*a* and 6*b* fused thereto so as to be in parallel with each other although only the thermosensitive element 6*a* can be seen in the drawing. The electrode holder 4 has also several gas induction holes 7 passed therethrough symmetrically with respect to the center axis of the casing 1.

Further, arranged within the casing 1 is a nozzle 8 near the junction terminal board $3_0$ so as to confront the electrode holder 4 and to be spaced therefrom. The nozzle 8 is provided centrally thereof with a nozzle orifice 9 with a number of auxiliary nozzles 10 being arranged in a circle at equi-angular intervals around orifice 9. A dust plate 11 is also provided within the casing 1 substantially midway between the nozzle 8 and the junction terminal board $3_0$.

The electrostriction pump 3 forms a pump chamber 12 between the surface of the electrostriction transducer 3*a* opposite to the pump holder 2 and the surface of the pump holder 2 itself, and upon oscillation of the electrostriction transducer 3*a* due to the supply of electricity to the electrostriction pump 3 from an outside electrical source, the gas is compressed within the pump chamber 12, the compressed gas being discharged from the pump chamber 12 through the discharge orifices 13 formed in the oscillator or electrostriction transducer 3*a*, and is guided through the flow passages 14 formed axially in the casing 1 from the gas induction holes 7 to a space formed between the nozzle 8 and the dust plate 11, and thence led through the nozzle orifice 9 and the auxiliary orifices 10 into the inside of a hollow cylindrical portion 15 formed centrally the casing 1, whereby the compressed gas is injected towards the electrodes 5*a* to 5*d*. After the gas equally cools the thermosensitive elements 6*a* and 6*b* respectively fused to the pairs of the electrodes 5*a*, 5*b* and 5*c*, 5*d*, it is exhausted towards the electrostriction transducer 3*a* from several discharge orifices 16 formed in the electrode holder 4. The exhausted gas is caused to be returned again to the nozzle 8 through the flow passages 14 by the action of the electrostriction pump 3 so that it is forced to be always circulated inside the casing 1.

The casing 1 is also provided with an IC- unit 20 outside the junction terminal board $3_0$ which is, on one hand, provided with terminals to receive electricity from the outside as well as to deliver the output signals of the thermosensitive elements 6*a*, 6*b* outside, and on the other hand is connected to the junction terminals 23 led from the junction terminal board $3_0$ outwards the casing 1 through lead pins 22 protruding towards the casing 1 from the outside.

The junction terminals 23 are adapted to be appropriately supplied with electricity necessary for the operation of the electrostriction oscillating pump 3 as well as the heating of the thermosensitive elements 6*a*, 6*b* from the IC-unit 20 through the lead pins 22 and a number of electric wires 24 which are connected to the lead pins 22 and passed through the casing 1 axially to the pump 3 and the thermosensitive elements 6*a*, 6*b*. The junction terminals 23 serve to take out the output signals issued from the thermosensitive elements 6*a*, 6*a* to the IC-unit 20 through the electrical wires 24 similarly disposed within the casing 1.

The casing 1 further has electrical heating wires 25 wound around its outer periphery over its hole length, the casing 1 together with the heating wire 25 being entirely covered by a hollow cylindrical heat insulating cover 26, and only the terminals of the IC-unit 20 protruding through the cover 26 to be exposed outside. In FIG. 1 the reference numeral 27 denotes a temperature sensor mounted outside the casing 1.

The operation of a conventional gas-rate sensor having a constitution as described above is as follows.

Upon supplying electricity from the IC-unit 20 to the electrostriction oscillating pump 3 mounted to the pump holder 2, the electrostriction transducer 3*a* is made to oscillate, and compresses the gas contained in the pump chamber 12. The compressed gas is made to flow through the discharge orifices 13 and the induction holes 7 into the flow passage 14 towards the dust plate 11, the gas reaching the nozzle 8 so that it is made to flow from the nozzle orifice 9 and the auxiliary nozzles 10 towards the electrode holder 4, finally passing through the discharge orifices 16. In this case, since the thermosensitive elements 6*a* and 6*b* fused to the ends of the pairs of the electrodes 5*a*, 5*b* and 5*c*, 5*d*, respectively, are exposed to the flow of the compressed gas the gas passes over the elements 6*a* and 6*b* to cool them equally. In this case, when an angular velocity is applied to the casing 1 the flow of the compressed gas within the casing 1 is deflected. Consequently the thermosensitive elements 6*a* and 6*b* are cooled unequally by the gas, and the difference in temperature between them is output as a voltage. However, since the output voltage is minute it is amplified by the IC-unit 20 and taken out from the terminals 21 as an angular velocity signal.

Thus, since the conventional gas-rate sensor of this type is actuated by the difference in cooling between the thermosensitive elements 6*a* and 6*b* it is innevitably sensitive to temperature. Accordingly, it can be protected from the influence of the variations in outside temperature by controlling the temperature of the gas-rate sensor at a fixed temperature higher than the maximum temperature to which the sensor is expected to be subjected.

For this purpose, in the conventional gas-rate sensor, as described above, as a temperature control means the electrical heating wires 25 are wound around the outer periphery of the casing 1, and they are entirely surrounded by the heat insulating cover 26 to maintain warmth. In this case, the setting of the heating temperature is detected by the temperature sensor 27 separately mounted to the outer surface of the casing 1, and the temperature of the casing 1 is regulated to a fixed temperature on the basis of the detected value.

However, as described above, since the gas-rate sensor cannot remain uninfluenced by variations in the outside temperature there arise such problems that the environmental range of use of the gas-rate sensor is limited, etc. Therefore, in order to resolve the problems the temperature control means as described above has been principally adapted, but such a temperature control means takes a relatively long time before it reaches and stabilizes at a predetermined set temperature requiring considerable electricity.

That is, in a temperature control system of a conventional gas-rate sensor having such a constitution that electrical heating wires 5 are wound around the outer periphery of a casing 1 and it is kept warm by a heat insulating cover 26, in order to heat up the thermosensitive elements 6*a* and 6*b*, which are greatly influenced by temperature, to a predetermined temperature, first the casing 1 has its outer periphery heated by the electrical heating wires 25, and the inner peripheral surface is heated by the heat conducted from the outer periphery through the wall of the casing 1, the gas sealed within the casing 1 being heated then by the heated inner peripheral surface through heat transfer, and the thermosensitive elements 6*a* and 6*b* are heated by the heated gas to reach a predetermined temperature. Thus it will be appreciated that in a conventional heat control system for a gas-rate sensor it takes a long time before the sensor reaches a definite set temperature and has its temperature stabilized, and that until it reaches that temperature it remains in a state where its performance is unstable.

SUMMARY OF THE INVENTION

It is a primary object of the present invention to provide a gas-rate sensor which can eliminate the problems inherent to the conventional gas-rate sensors as exemplified above.

It is another object of the present invention to provide a gas-rate sensor which can have the thermosensitive elements heated to a predetermined temperature within an extremely short time, consuming very little electricity.

It is a further object of the present invention to provide a gas-rate sensor which can improve the accuracy of the detection of angular velocity by maintaining the thermosensitive elements under a stable temperature environment within the casing of the sensor regardless of the outside temperature.

In accordance with the present invention a gas-rate sensor is provided in which a heating means is mounted inside the casing of the sensor so as to be in direct contact with the gas sealed therein.

With such a constitution the gas-rate sensor according to the present invention can reveal such effects that the thermosensitive elements can be raised to a desired temperature within a very short period of time with a low consumption of electricity and maintained stably at that temperature.

That is, in the present invention, since the sealed gas surrounding the thermosensitive elements is directly heated by the heating means the thermosensitive elements can be substantially simultaneously heated by the sealed gas which has been directly heated by the heating means to reach the desired temperature rapidly. Therefore, after the supply of electricity to the gas-rate sensor it is not only promptly made ready for exhibiting its prescribed functions and performance, but also the consumption of electricity is considerably decreased owing to the effective utilization of the heating energy thanks to the heating means as described above.

In a preferred embodiment of the present invention the casing of the gas-rate sensor is additionally surrounded by electric heating wires similar to a conventional gas-rate sensor in order to heat the gas sealed therein in association with the heating means mounted within the casing, ensuring a more rapid and stable heating of the thermosensitive elements.

BRIEF DESCRIPTION OF THE DRAWINGS

These and other objects of the present invention will become more readily apparent upon reading the following description and upon reference to the accompanying drawings, wherein.

The same reference numericals are affixed to the same or similar elements throughout the drawings.

DESCRIPTION OF THE PREFERRED EMBODIMENTS

Figure 1:
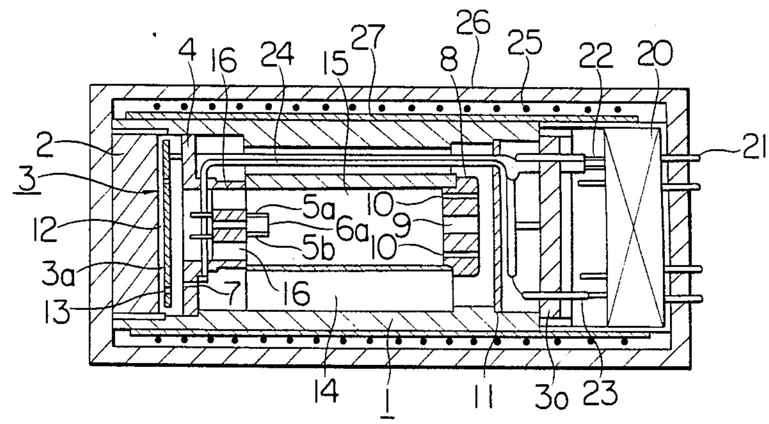
FIG. 1 is a longitudinal sectional elevational view of an example of a conventional gas-rate sensor.
Figure 2:
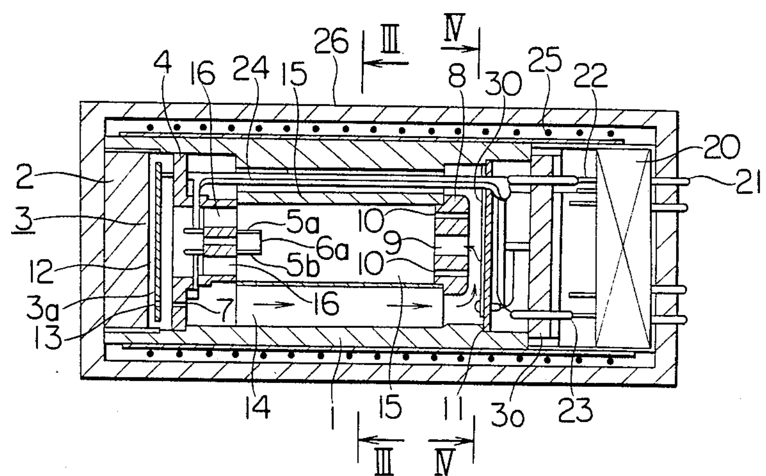
FIG. 2 is a view similar to FIG. 1, but illustrating one embodiment of a gas-rate sensor in accordance with the present invention.
Figure 3:
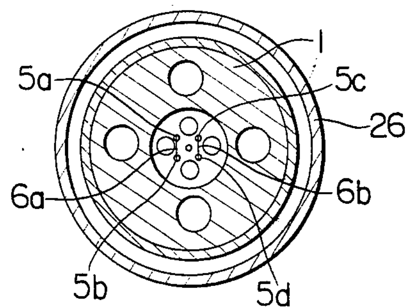
FIG. 3 is a cross sectional view of the sensor shown in FIG. 2 taken along the line III—III of FIG. 2.
Figure 4:
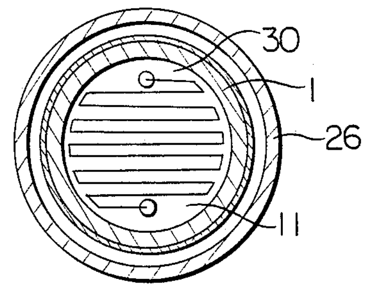
FIG. 4 is a cross sectional view of the sensor shown in FIG. 2 taken along the line IV—IV of FIG. 2.

Referring now to FIGS. 2 to 4 of the accompanying drawings wherein is shown an embodiment of the present invention which has a configuration generally similar to a conventional gas-rate sensor described above and illustrated in FIG. 1 except that in the former a heater plate 30 such as shown in FIG. 4 is mounted inside the casing 1 by arranging it on the inner surface of the dust plate 11 which is disposed opposite the nozzle 8.

Thus, in accordance with the present invention the gas to be injected through the nozzle orifice 9, etc. of the nozzle 8 is made to come into direct contact with the heater plate 30 which is provided with an electrical heating wire in a wave like fashion and has been previously heated by an electric current. Therefore, the gas can be heated to a predetermined temperature within a short time.

Thus, since the gas sealed within the casing 1 is directly heated by the heater plate 30 and the gas is forced to be circulated within the casing 1 the temperature distribution of the gas within the casing 1 is equalized, and the temperature reaches a predetermined temperature within a short period of time, resulting in that the thermosensitive elements *6a* and *6b* which are very sensitive to variations in temperature of the environment are maintained at a stable temperature condition. Accordingly, more precise angular velocity output signals are obtainable than that of the conventional gas-rate sensor.

Further, the gas-rate sensor in accordance with the present invention can be additionally provided with a conventional temperature control means such as by winding the electrical heating wires 25 around the outer periphery of the casing 1, and in this case, by setting the control temperature of the heating wires 25 so as to be somewhat lower than that of the heater plate 30 the gas can be protected from being directly influenced by variations in outside temperature, making it possible to regulate the gas temperature more precisely.

While several preferred embodiments of the present invention have been described and illustrated herein it will be understood that changes and modification may be made thereto without departing from the spirit of the invention.

What is claimed is:

1. In a gas-rate sensor having a sealed hollow cylindrical casing with a hollow cylindrical space being coaxially formed therein, a gas pump arranged within said casing at one end of said cylindrical space to generate a gas flow therein, a nozzle means arranged within said casing at the other end of said cylindrical space so as to inject said gas flow into said cylindrical space as a gas jet, and a pair of thermosensitive elements arranged within said cylindrical space near said one end thereof so as to be subjected to said gas jet, whereby when said casing is applied an angular velocity input said gas jet is forced to be deflected relative to said casing so that said thermosensitive elements are unequally cooled, causing change in electrical resistance proportional to said angular velocity input between said pair of thermosensitive elements, and said angular velocity being allowed to be detected by the measurement of said temperature difference, the improvement wherein:

said hollow cylindrical space of said hollow cylindrical casing being provided with a heater plate therein to directly heat said gas sealed within said casing so that said thermosensitive elements can be heated to a predetermined temperature by said heated sealed gas within a short time.

2. A gas-rate sensor as claimed in claim 1, wherein said heater plate is mounted to the inner surface of a dust plate arranged within said hollow cylindrical space so as to confront said nozzle means.

3. A gas-rate sensor as claimed in claim 1, wherein the outer peripheral surface of said cylindrical casing is additionally wound by electric heating wires.

4. A gas-rate sensor as claimed in claim 3, wherein the heating outputs of said heater plate and said heating wires are so selected that the heated temperature of the former is somewhat higher than that of the latter.

* * * * *